United States Patent
Wilt

(10) Patent No.: US 7,519,781 B1
(45) Date of Patent: Apr. 14, 2009

(54) PHYSICALLY-BASED PAGE CHARACTERIZATION DATA

(75) Inventor: Nicholas P. Wilt, Rochester, NY (US)

(73) Assignee: NVIDIA Corporation, Santa Clara, CA (US)

( * ) Notice: Subject to any disclaimer, the term of this patent is extended or adjusted under 35 U.S.C. 154(b) by 533 days.

(21) Appl. No.: 11/312,151

(22) Filed: Dec. 19, 2005

(51) Int. Cl.
*G06F 12/00* (2006.01)

(52) U.S. Cl. .................. 711/154; 711/156; 711/157; 711/206; 345/531; 345/536; 345/539; 345/545; 345/556; 345/565

(58) Field of Classification Search .................. 711/154, 711/156, 157, 206; 345/531, 536, 539, 545, 345/556, 565
See application file for complete search history.

(56) References Cited

U.S. PATENT DOCUMENTS

| 5,990,914 | A * | 11/1999 | Horan et al. ................ 345/531 |
| 6,330,654 | B1 * | 12/2001 | LaBerge et al. ............. 711/207 |
| 6,526,497 | B1 * | 2/2003 | LaBerge et al. ............. 711/207 |
| 2002/0093507 | A1 * | 7/2002 | Olarig ........................ 345/568 |

* cited by examiner

*Primary Examiner*—Stephen C Elmore
(74) *Attorney, Agent, or Firm*—Townsend and Townsend and Crew LLP; J. Matthew Zigmant

(57) ABSTRACT

Circuits, methods, and apparatus for efficiently storing page characteristics. Page characteristics for memory pages are stored post address translation using addresses for physical locations in memory, for example, in a bit vector. The characteristics may include access or dirty bits, as well as other types of information. These bit vectors can also be stored and accumulated to generate histogram data. Two bit vectors may be included, while a first bit vector is written to, another is used. After data has been written to the first, the bit vectors are flipped, and data is written to the second while the first is used.

19 Claims, 11 Drawing Sheets

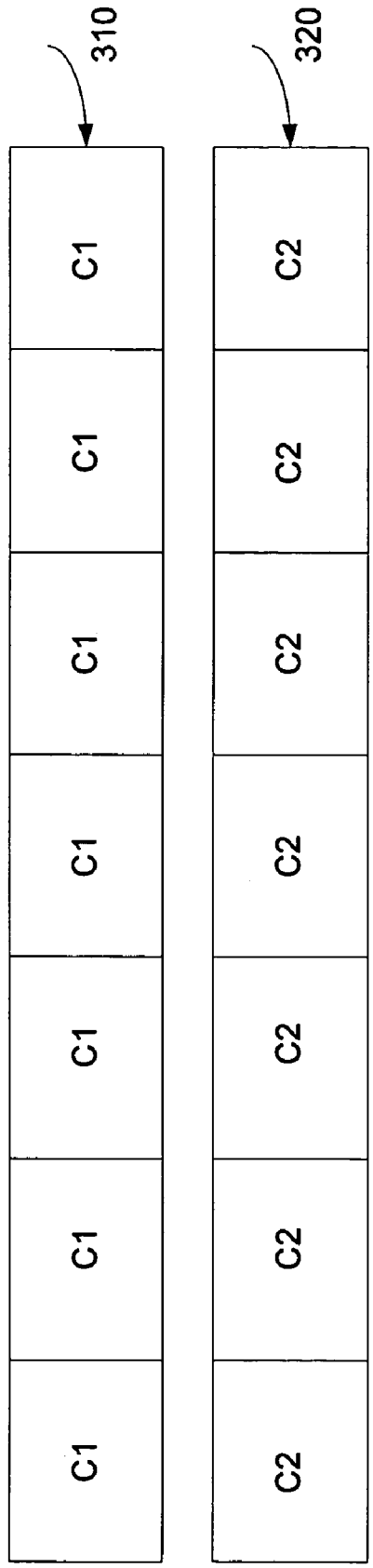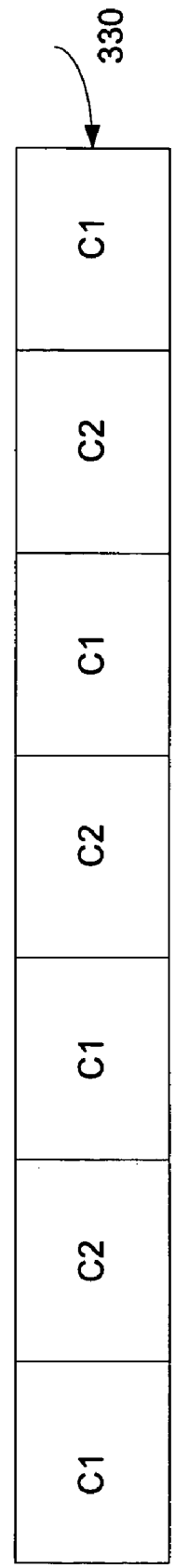
Figure 3A
Figure 3B

PHYSICALLY-BASED PAGE CHARACTERIZATION DATA

BACKGROUND

The present invention relates generally to memory management and more particularly to a more efficient storage of memory management characteristics for data in memory.

The amount of data needed by applications running in a computer system has greatly increased the past few years, and the rate of this increase shows no sign of abating. To handle this data, computer systems need to incorporate improved ways to manage data in memory.

Data stored in memory is typically arranged in pages. These pages are stored at physical addresses in one or more memory devices, for example one or more DRAMs and hard disk drives. A DRAM can only store a limited amount of data, but is able to quickly provide it for use by an application. A hard disk drive stores a great deal of data, but is slower to provide it.

Access times make DRAM memory the more desirable destination, but space is short. Accordingly, pages that are not needed by an application can be moved from DRAMs to a higher level of memory, such as a hard disk drive. Similarly, when a page is needed but not available in DRAMS—a page fault—the page can be read back from the disk to the DRAM. When pages are swapped in this manner, their physical addresses change.

It is undesirable and inefficient for applications running on a computer system to keep track of these changing physical addresses. Thus, applications use virtual addresses, which may remain static. Virtual addresses can be translated to physical addresses using a translation lookaside buffer, which includes a number of page table entries. As a page moves, the page table entry is updated.

Page table entries can be used to store other characteristics of a page as well as its physical address. A virtual memory manager (VMM) can use these characteristics in managing the data in memory. But storage of these characteristics can be complicated, requiring complex software and hardware.

Accordingly, what is needed are circuits, methods, and apparatus that provide an efficient storage of these characteristics.

SUMMARY

Accordingly, embodiments of the present invention provide circuits, methods, and apparatus for efficiently storing page characteristics. An exemplary embodiment of the present invention stores characteristics for memory pages post translation (after virtual addresses have been converted to physical addresses) using addresses for physical locations in memory. The physical addresses used to store the characteristics may be contiguous or noncontiguous. They may be sequenced such that they form a vector or an array, though for simplicity an array is typically described in this document. Since the addresses are stored in physical memory, only characteristics for pages that are resident in physical memory are stored, characteristics for those pages that have been swapped out to disk do not need to be stored.

The characteristics stored in this way can include page usage or access bits; dirty bits, which indicate whether data has been updated in cache; bits indicating whether data may be cached; bits indicating whether data is stored as compressed data; as well as other types of information. These characteristics may refer to a page, part of a page or more than one page of data in memory.

Data regarding these characteristics can be stored for a certain duration or period to generate a bit vector. For example, page usage can be tracked for a number of pages in memory. After this, the page usage bit vector can be used, for example in determining which page to swap out to disk following a page fault.

Another exemplary embodiment of the present invention stores prior characterization data in order to generate more useful information. Specifically, a number of bit vectors are generated and stored. The values of these bit vectors can be accumulated on a page by page basis (or partial page or multiple page basis). For example, a number of bit vectors of page usage information can be stored. The page usage information can be accumulated to generate histogram values. The histogram thus shows if a page was accessed during a period for a number of such periods.

For many characteristics, data is continuously being written to their bit vector, that is, the bit vectors are continuously being updated. This makes it difficult to read values in a bit vector. Accordingly, an exemplary embodiment of the present invention utilizes two bit vectors; one bit vector is written to while the other is read.

Specifically, characteristics are written to a first bit vector. Once this is complete, data is written to a second bit vector. While data is written to the second bit vector, data from the first is copied, for example for use in a histogram as described above, and then cleared. After data has been written to the second bit vector, the two bit vectors are once again flipped, and data is written to the first, while the second is copied and cleared. A specific embodiment of the present invention performs the copying and clearing in hardware, though in other embodiments this is done in software. Various embodiments of the present invention may incorporate one or more of these and the other features described herein.

A better understanding of the nature and advantages of the present invention may be gained with reference to the following detailed description and the accompanying drawings.

BRIEF DESCRIPTION OF THE DRAWINGS

FIGS. 3A and 3B illustrate bit vectors that may be used in an embodiment of the present invention;

DESCRIPTION OF EXEMPLARY EMBODIMENTS

Figure 1:
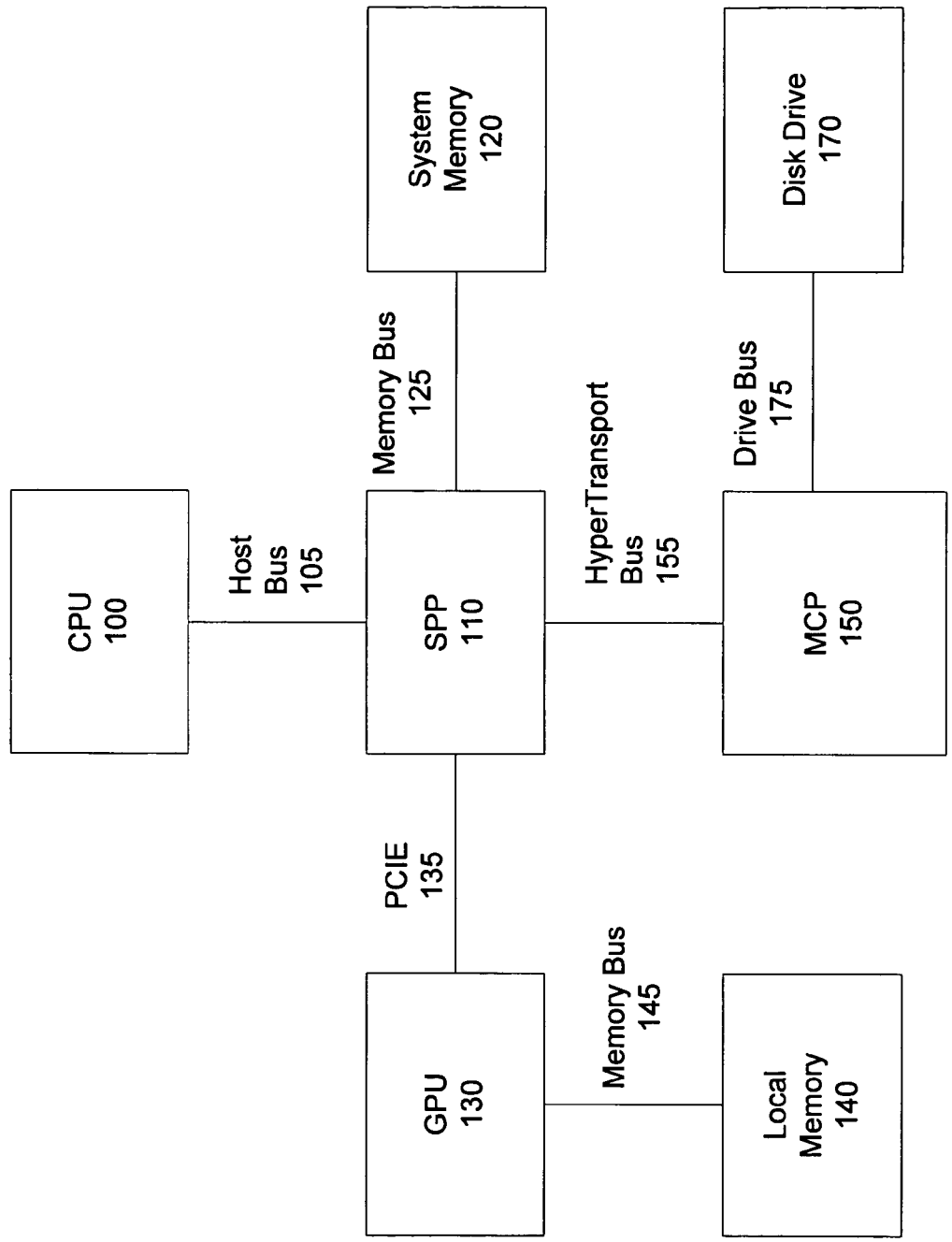
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, frame buffer, local, or graphics memory 140, MCP 150, and hard disk drive 170.

The CPU 100 connects to the SPP 110 over the host bus 105. The SPP 110 is in communication with the graphics processing unit 130 over an advanced graphics port (AGP) or peripheral component interconnect express (PCIE) bus 135. The SPP 110 reads and writes data to and from the system memory 120 over the memory bus 125. The MCP 150 communicates with the SPP 110 via a high-speed connection such as a HyperTransport bus 155, and connects network and internal and peripheral devices (not shown) as well as hard disk drive 170 to the remainder of the computer system. The graphics processing unit 130 receives data over the AGP or PCIE bus 135 and generates graphic and video images for display over a monitor or other display device (not shown). The graphics processing unit 130 may make use of a frame buffer or graphics memory 140—via the memory bus 145—as well as the system memory 120.

The CPU 100 may be a processor, such as those manufactured by Intel Corporation, Advanced Micro Devices, or other supplier, and are well-known by those skilled in the art. The SPP 110 and MCP 150 are commonly referred to as a chipset. The memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

Embodiments of the present invention may be used to improve the graphics processing unit 130. Also, other systems and circuits are improved by the incorporation of embodiments of the present invention. For example, the GPU 130 and SPP 110 may be combined as an integrated graphics processor or IGP. This device is similarly improved by the incorporation of embodiments of the present invention. Moreover, the CPU 100 and other types of processors, such as video, audio, or general purpose processors, and other types of processors and circuits may be improved by the incorporation of embodiments of the present invention. Also, while embodiments of the present invention are well suited to managing memory data for video and graphics applications, other types of data in audio or other applications may be similarly improved. Further, other types of circuits will be developed, or are currently being developed, and these may also be improved by the incorporation of embodiments of the present invention.

Again, applications running on the CPU 100, GPU 130, or other circuit, store data in memory, where the data is arranged in pages. These pages may be stored in the fast, easily accessible DRAM based memory such as the system memory 120 or graphics memory 140, or in the slower, less accessible disk drive 180. Again, it is desirable to store data being used by an application in the faster DRAM memory. If data is not being used, it can be swapped out to disk, while if it is needed, it can be brought in from the disk and stored in DRAM.

The data stored in these locations have physical addresses that depend on the physical location of the page. Since it is undesirable for an application to track these address changes, applications use virtual addresses, which can then be translated to physical addresses. An example showing the translation of virtual addresses to physical addresses is shown in the following figure.

Figure 2:
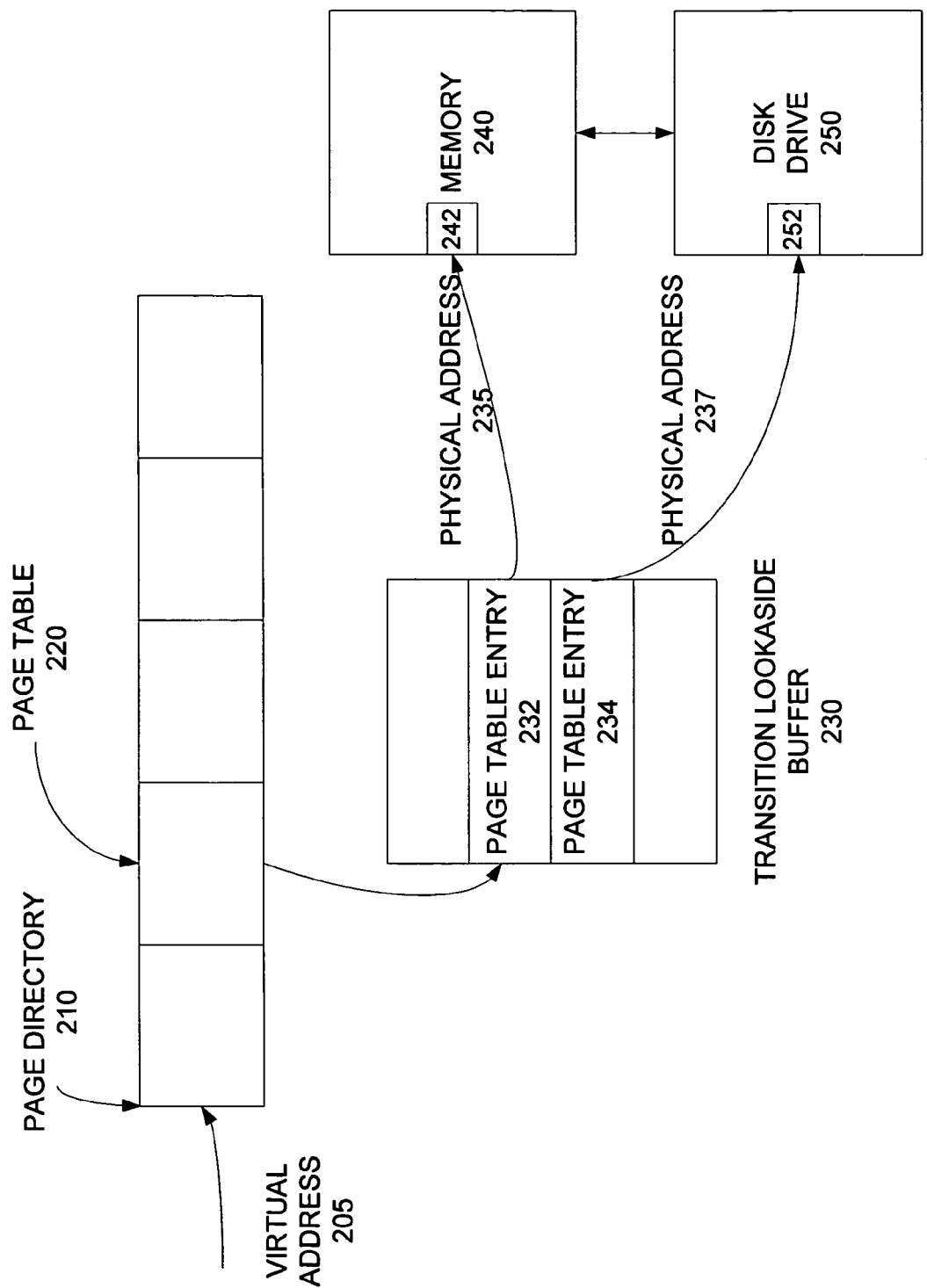
FIG. 2 is a diagram showing the translation of a virtual address to a physical address which identifies a location a memory.

FIG. 2 is a diagram showing the translation of a virtual address to a physical address which identifies a location a memory. This figure includes a page directory 210 that includes a number of page tables 220. Each page table includes a number of page table entries, each of which include a physical address in a memory, such as the address 242 in memory 240 or the address 252 in disk drive 250.

Whether a page has been used can be tracked using page usage bits. If a page is used, its page usage bit is set. Both page usage bits and physical addresses can be stored in page table entries, along with other types of data that characterize a page. Examples of other data that may be stored in a page table entry include dirty bits that indicate whether a page has been updated in cache, compression bits that indicate whether data in the page is compressed, and bits that indicate whether data in a page may be cached.

Software know as a virtual memory manager sweeps these page tables 220 to determine, among other things, which are candidates for eviction, that is, it checks page usage bits to determine which pages are not being accessed such that they can be replaced in the event of a page default.

But it is difficult to store this information in virtual space. Also, data needs to be stored for each virtual page, whether it is physically located in DRAM or on disk. Accordingly, an embodiment of the present invention stores page usage or other characterization data post translation using physical addresses. In this way, only those pages that reside in DRAM memory are stored.

This characterization data can be stored using contiguous or noncontiguous physical addresses. The addresses may be linear, as in a vector, or as an array. The data may be stored using various banks, giving the resulting data structure a three-dimensional quality. Examples of contiguous and noncontiguous bit vectors are shown in the next figure.

FIGS. 3A and 3B illustrate bit vectors that may be used in an embodiment of the present invention. FIG. 3A includes two vectors 310 and 320. These vectors include a number of bits corresponding to characteristics for pages in memory. In this example, the characteristics are referred to as C1 and C2. In other embodiments, each of these characteristics may refer to parts of pages, or multiple pages in memory.

Various characteristics for pages in memory may be tracked using bit vectors 310 and 320. For example, these characteristics may be page usage information, reflecting whether a page and memory has been accessed during a preceding period of time. These vectors may also store information regarding whether a page and memory has been updated in a cache, such as a cache and a central processing unit or graphics processing unit.

Other information may be stored in these bit vectors. For example, graphics information such as pixel values, texels, and the like are often compressed. A status data bit indicating whether this data is stored in a compressed format can be stored along with the data itself. This data may be referred to as an annotation, and a vector or array storing a number of these status of bits may be referred to as an annotation data structure. Still other information may be stored in these bit vectors. For example, some types of data, such as graphics data should not be stored in a cache. Accordingly, page table entities may include bits indicating whether the data is cacheable. These bits may be stored in a bit vector, such as the bit vectors 310 or 320.

In FIG. 3A, the characteristics C1 and C2 are stored in a contiguous manner in bit vectors 310 and 320. In other embodiments, the data that may be stored in a noncontiguous fashion, such as shown in the following figure.

In FIG. 3B, two characteristics are stored in an interleaved manner in bit vector 330. Still other combinations are possible, for example, 3, 4, or more characteristics may be stored in a bit vector such as the bit vector 330, and these characteristics may be stored in a number of arrangements.

These bit vectors may be generated by different circuits such as the circuits in FIG. 1, and stored in various memory locations. For example, the CPU 100 may generate and store this information in the system memory 120. Also, the GPU 130 may generate and store this in the graphics memory 130, or in a video memory in the system memory 120, while the SPP 110 may also store this in the system memory 120. Data can be written from these devices to the memory using a frame buffer interface on the device itself or a frame buffer interface that is on another device.

In another embodiments, this data may be stored on-chip, since these vectors are reasonably sized. For example, given a 4 kbyte page size, 1 gigabit of memory can be tracked using $(10\hat{0}9)/(8(4\times10\hat{0}3))$ or 32 k bits, where $\hat{0}\hat{0}$ is a symbol meaning "to the power of."

Depending on the exact implementation, these vectors may need to be translated back to virtual space for use by a CPU. However, CPUs are sufficiently fast at this time that this task should not be unduly burdensome.

Again, only characteristics of pages residing in DRAM memory are stored. Characterization data for pages that are on disk is not needed. For example, it is not of interest whether a page on disk has been accessed; if it is not accessed, it will be brought in from disk and stored in the DRAM memory.

This means that such characterization bits, or an annotation structure, can be omitted when data is swapped out to disk and reinstated when read back from memory. The annotation structure can be reinstated by examining the annotated data (the page data in memory) itself, or by setting a default value.

For example, data may be compressed and stored in memory, where each page has a corresponding compression bit indicating whether it is compressed. When this data is swapped out to disk, the compression bits may be omitted. When the data is reinstated in DRAM memory, the compression bits may be reconstructed. This may be done by examining the data itself and making a determination of whether the data is compressed. Alternately, a default value, likely indicating non-compressed, may be used for the reinstated data.

This principle may be used for other characteristics as well. Again, page usage bits may be deleted when a page is written out to disk. Once reinstated, a default value of accessed (since it was just brought in) can be used initially.

Vectors such as bit vector 310 and 320 in FIG. 3A and bit vector 330 in FIG. 3B offer a snapshot view of a characteristic. These vectors may be compiled and stored in an array in order to give a more meaningful look at the particular characteristic.

Figure 4:
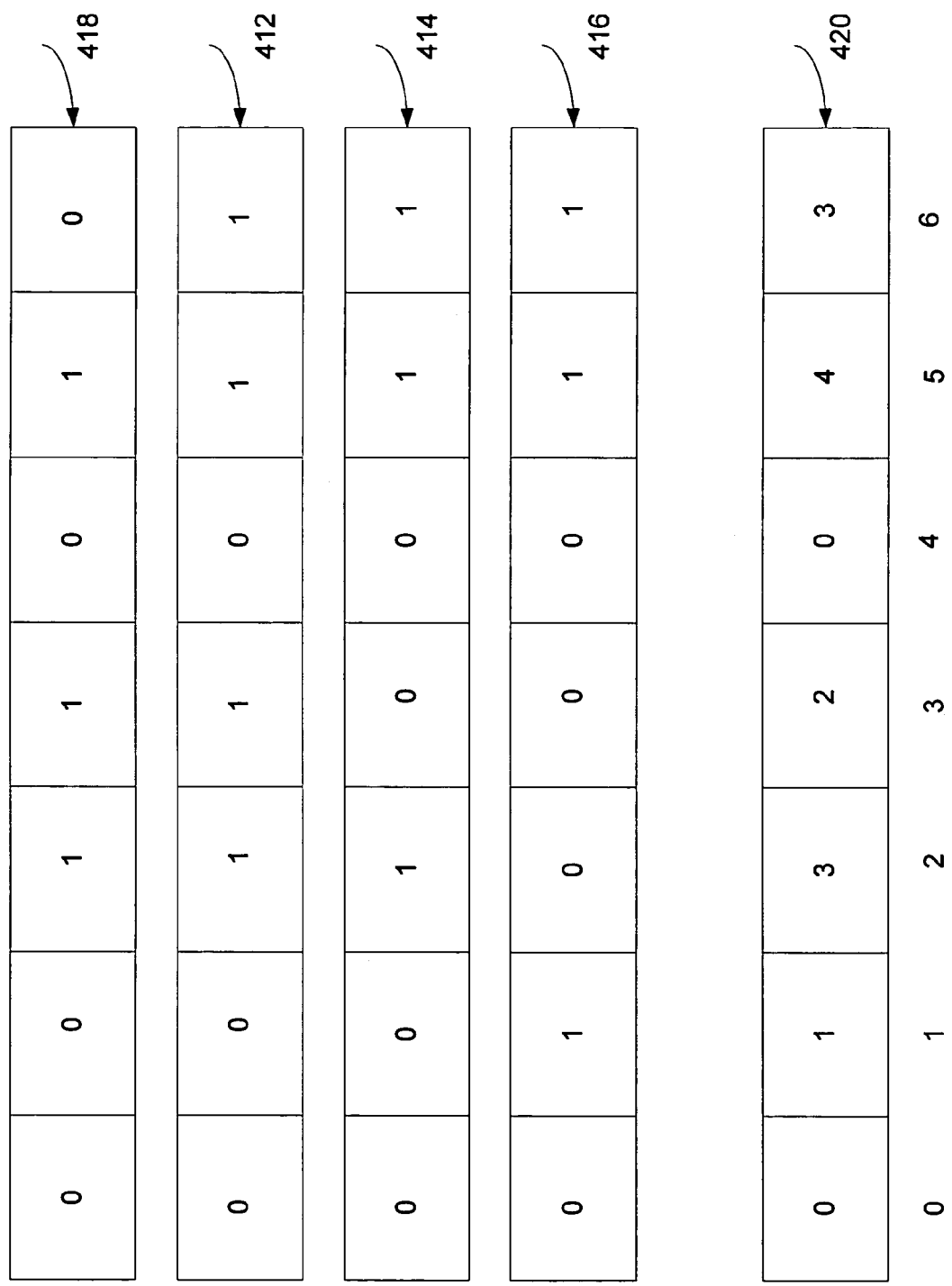
FIG. 4 illustrates an array of bit vectors used to generate histogram values according to an embodiment of the present invention.

FIG. 4 illustrates an array of bit vectors used to generate histogram values according to an embodiment of the present invention. This figure includes bit vectors 412, 414, 416, and 418, and histogram values 424. The histogram values may be for a number of page tables, here labeled 0-6. Alternately, the histogram values may each be for a part of a page table or multiple page tables.

In this specific example, individual bit vectors are stored in one of four locations. Here, bit vector 412 is written to first, followed by bit vectors 414, 416, and 418 in sequence. The vector characteristics have a value 0 or 1 and the characteristics for each page, or portion of the page or pages, are added to give histogram values 420. For example, page 0 has that characteristic values of 0 for each vector, thus its histogram value is 0. Conversely page 5 has a characteristic value of one for each of the bit vectors, thus its histogram value is four.

In a specific embodiment of the present invention, one particular characteristic tracked by such a histogram is page usage. Accordingly, each bit vector 412, 414, 416, and 418, indicates whether a page has been used during a period of time. Again, this is useful in determining which pages may be removed in the event of the page fault.

The histogram values 420 provide even greater insight as to which pages can be moved from memory to disk. The histogram values 420 provide not just information as to whether a page has been accessed during a period of time, but during how many periods of time the page was accessed. For example, in the event of a page fault, pages 0 and 4 are better candidates for eviction than page 1; page 1 has at least been accessed. However, if the most recent bit vector, bit vector 418, was the only information available, pages any of the pages 0, 1, 4, or 6 might be evicted.

In this particular example, there are four bit vectors whose values are added to generate a histogram value. In other embodiments of the present invention, other numbers of bit vectors may be added to generate a histogram value. Also, in this example, each bit in the bit vectors is equally weighted. In other embodiments of the present invention, the weighting may be unequal. For example, a more recent bit vector entry may be more highly weighted, on the theory that a page that has been recently accessed in more likely to be accessed again than a page that was more remotely accessed.

Again, in this example, bit vector 412 was written to first, thus it is the oldest bit vector. When a new snapshot or bit vector is to be incorporated in the histogram, this oldest bit vector is typically overwritten, though variations of this are possible consistent with embodiments of the present invention. One example of how to overwrite the vector 312 is shown in the following figures.

Figure 5A:
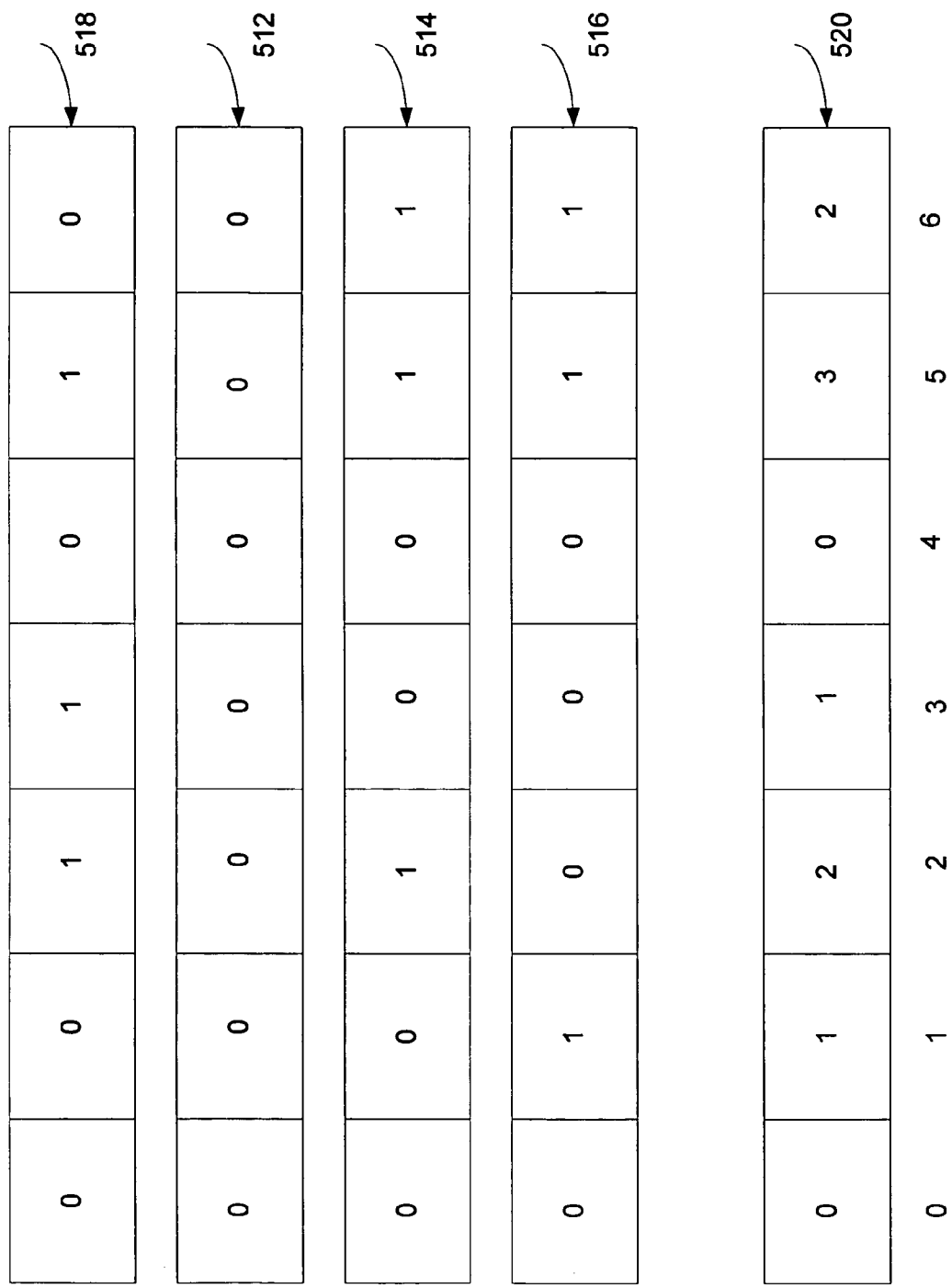
FIGS. 5A and 5B illustrate a method of overriding a bit vector and updating a histogram value according to an embodiment of the present invention.
Figure 5B:
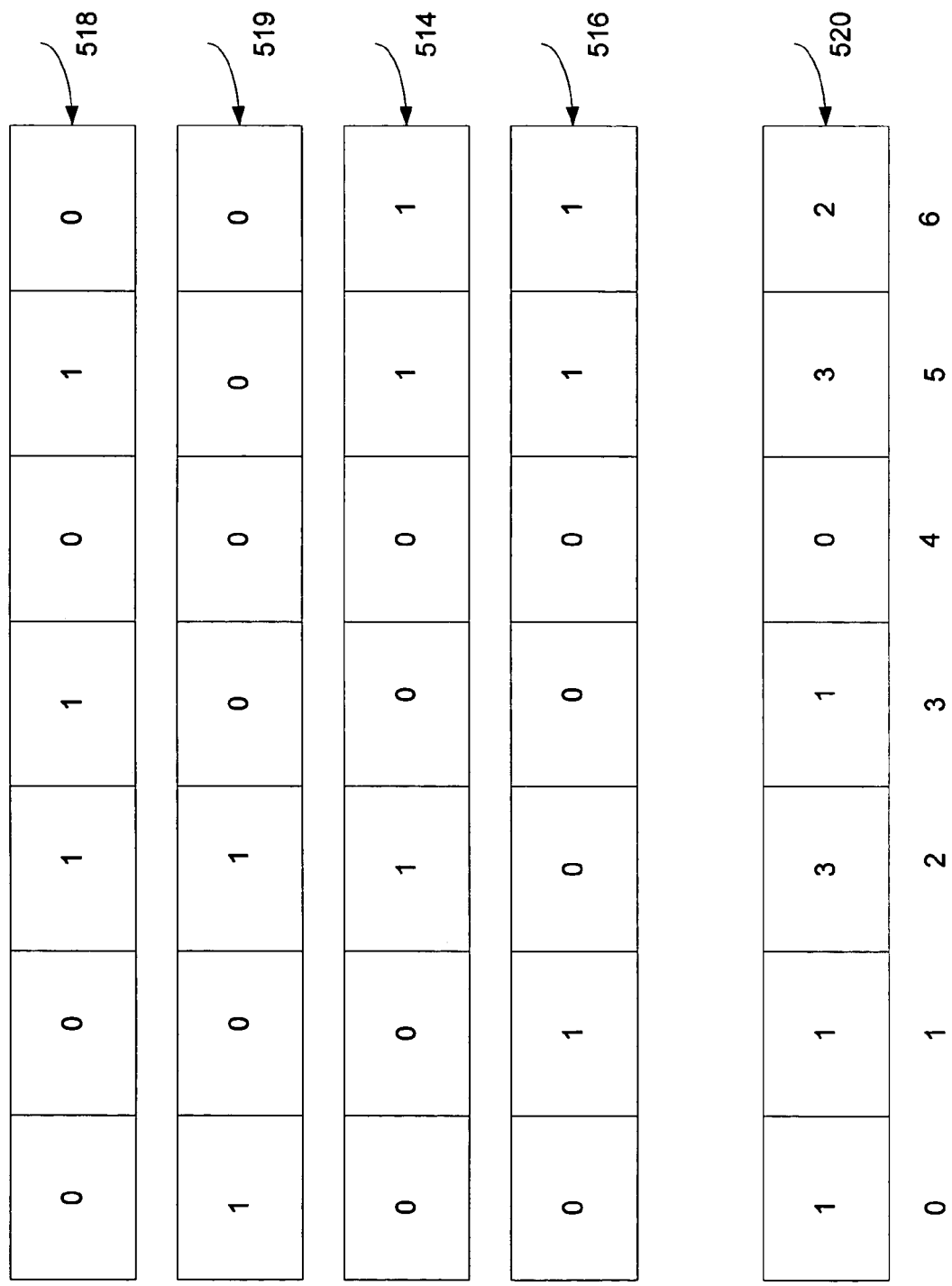

FIGS. 5A and 5B illustrate a method of overwriting a bit vector and updating histogram values according to an embodiment of the present invention. In FIG. 5A, bit vector or array line 512 is cleared such that each of its bits is reset to zero. The histogram values 520 are updated accordingly. For example, the value for page 2 in bit vector 512 is reset from a one to a zero. Accordingly, it histogram value is reduced from a 3 to a value of 2. Embodiments of the present invention may implement this in various ways. For example, the values for the bit vector or array line 512 to be cleared can be subtracted from the histogram values 520, after which the bit vector or array line 512 can be cleared. Alternately, the histogram values 520 may be implement as continuous totals of the lines in the array, such that when line 512 is cleared or reset to zero, histogram values 520 are updated automatically.

In FIG. 5B, a new bit vector 519 is written to the previously cleared location. The histogram values 520 are updated accordingly. For example, the page 0 value of bit vector or array line 510 is a 1, accordingly the histogram entry is incremented from a value of zero to a value of one.

As vector 510 is written to the bit vector array, the data being tracked continues to be produced. This makes it difficult to read data in a bit vector. Accordingly, an embodiment of the present invention writes data to two bit vectors. While data is written to one bit vector, it can be read from the other.

In one embodiment of the present invention, while a histogram is being updated with data from a first bit vector, data can be written to a second bit vector. One method of doing this is shown in the following figures.

Figure 6:
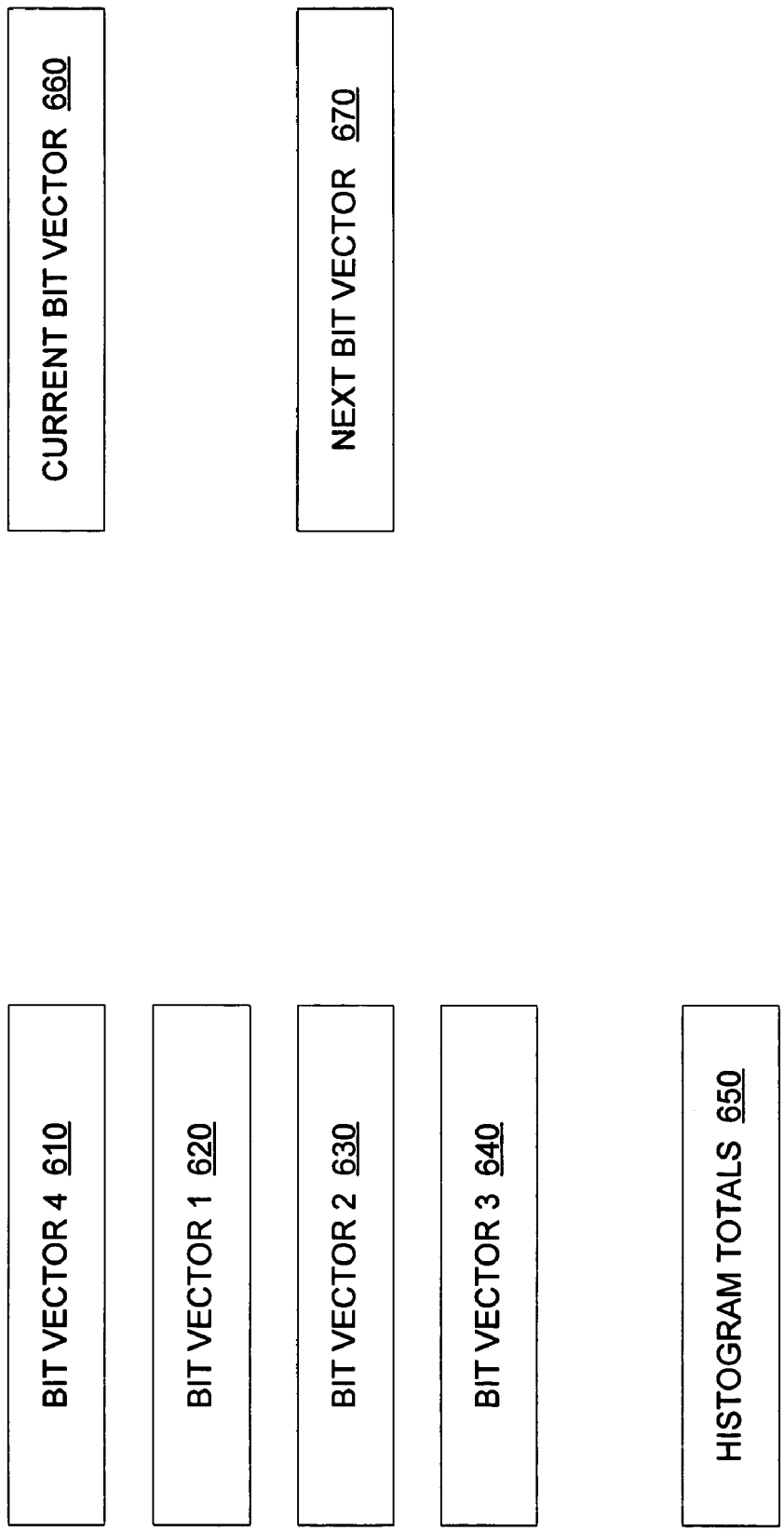
FIG. 6 illustrates a histogram including an array of bit vectors, as well as two bit vectors that may be used in updating the histogram according to an embodiment of the present invention.

FIG. 6 illustrates a histogram including an array of bit vectors, as well as two bit vectors that may be used in updating the histogram according to an embodiment of the present invention. This figure includes a histogram including the bit vectors vector 1 620, vector 2 630, vector 3 640, and vector 4 610, which are used to generate histogram totals 650, as well as current bit vectors 660 and next bit vector 670.

The previously generated characteristic data is stored in bit vectors 610, 620, 630, and 640. These bit vectors generate histogram totals 650. Data is written to the current bit vectors 660. Once the data has been written to the current bit vector 660, that data replaces the oldest bit vector of the bit vectors 610, 620, 630, and 640. At that time, data can be written to the next bit vectors 670. After the current bit vector 660 has been copied to the oldest bit vector 610, 620, 630, or 640, the current bit vector 660 may be cleared. An example is shown in the following figures.

Figure 7A:
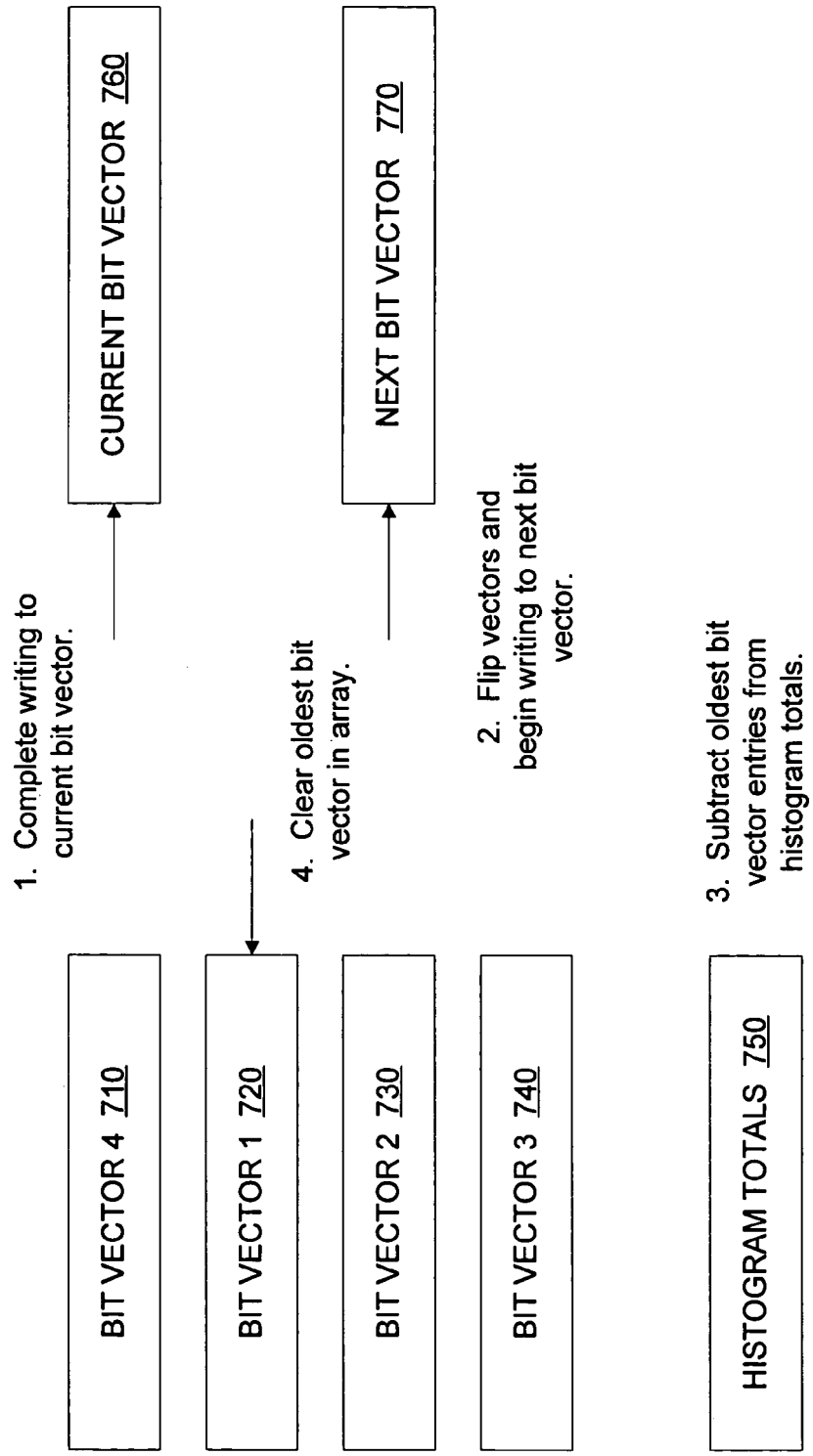
FIGS. 7A through 7C illustrate a method of updating histogram totals according to an embodiment of the present invention.
Figure 7B:
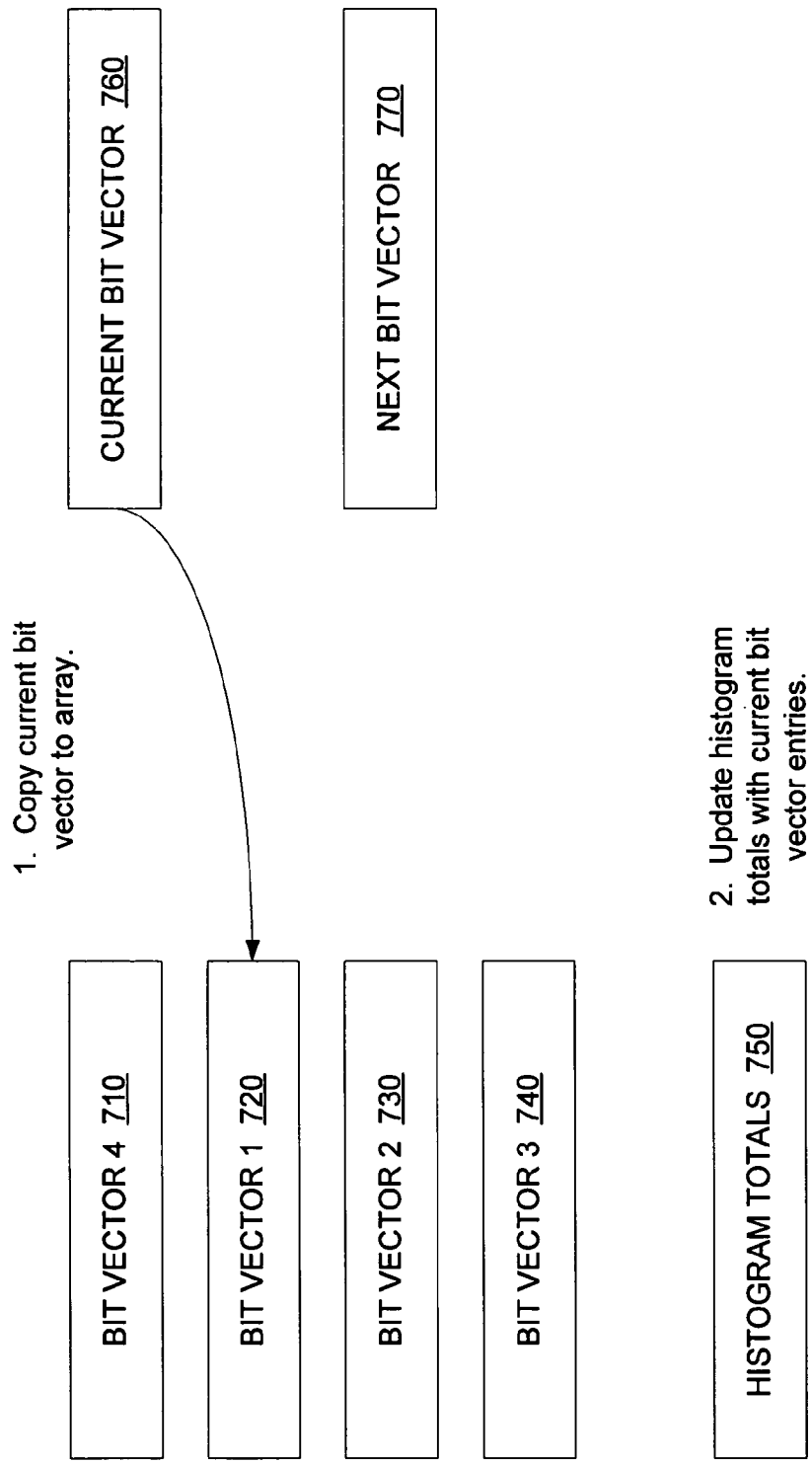
Figure 7C:
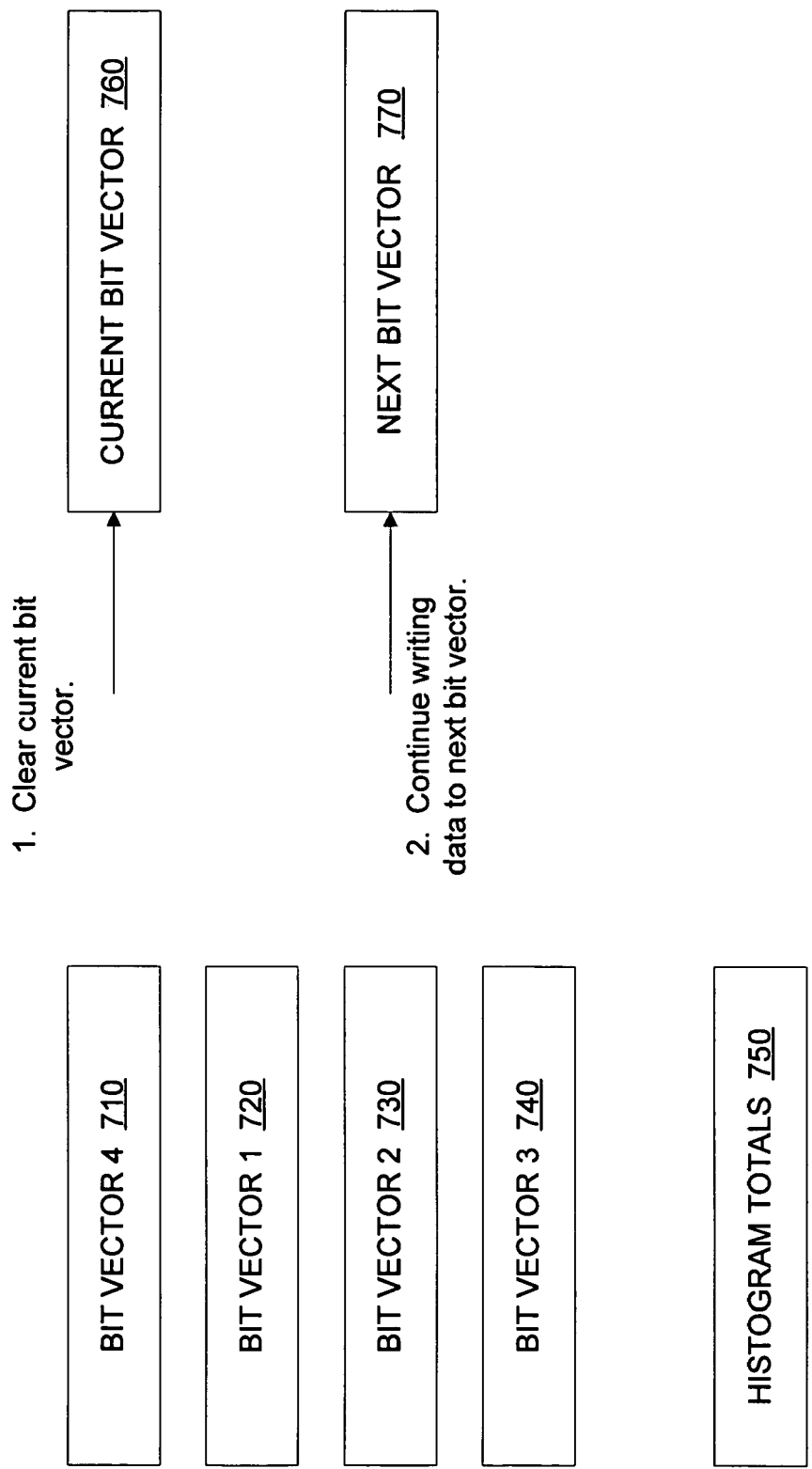

FIGS. 7A through 7C illustrate a method of updating histogram totals according to an embodiment of the present invention. These figures include histogram totals 750, which are generated by values in bits vectors vector 1 720, vector 2 730, vector 3 740, and vector 4 710. These bit vectors are updated by the current bit vectors 760 and next bit vector 770.

In FIG. 7A, writing to current bit vector 760 is completed. At this point, the bit vectors can be flipped and new data can be written to the next bit vector 770. The values of the array line or bit vector to be overwritten are subtracted from the histogram total 750, though this may be skipped if the histogram totals 750 are automatically updated with changes in the array lines or bit vectors 710-740. Once the histogram totals 750 are updated, values in bit vector 1 720 may be cleared. In FIG. 7B, the current bit vector 760 is copied to bit vector 1 720 and the histogram totals are updated with the new bit vector entry values.

In FIG. 7C, the current bit vector 760 can be cleared, such that it is ready for data after data has been written to the next vector 770. In this way, data is always being written to one of these two bit vectors, that is, either the current bit vector 760 or next bit vector 770.

Using a current and a next bit vector allows data to always be written to one vector or the other. After data is written to one, the buffers flip and data is written to the second. Data from the first can then be used to update a histogram value, before being cleared.

In various embodiments of the present invention, these various functions may be done by either software or hardware. In a specific embodiment of the present invention, hardware is used to accelerate the copying and clearing of these bit vectors. A flowchart illustrating the operation of such an embodiment is shown in the following figure.

Figure 8:
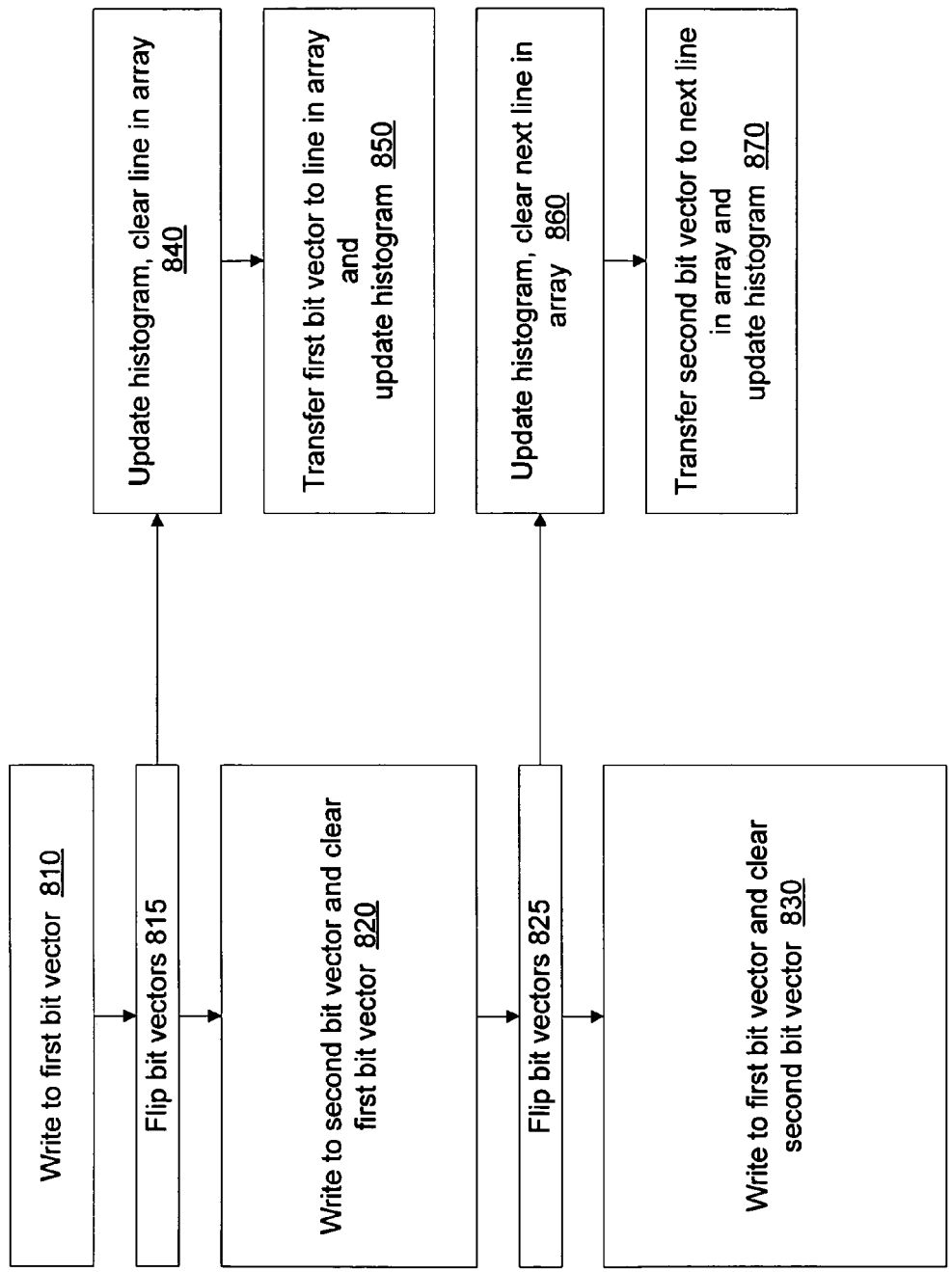
FIG. 8 is a flowchart illustrating a method of updating histogram values according to an embodiment of the present invention.

FIG. 8 is a flowchart illustrating a method of updating histogram values according to an embodiment of the present invention. Activities on the left side of this figures illustrate how either a first or second bit vector is always available to receive data, and how these vectors are flipped and cleared after data writing is complete. Activities on the right side of this figure illustrate activities performed by a histogram array using one of the bit vectors, while data is being written to the other bit vector.

Specifically, in act 810, data is written to a first bit vector. In act 815, the bit vectors are flipped. Data is written to a second bit vector in act 820. In act 840, histogram totals are updated by subtracting entries in the bit vector array line that is to be overwritten. Once the totals are updated, the array line can be cleared in act 840. In act 850, the first bit vector, now complete, is transferred or copied to the bit vector array line and the histogram is updated accordingly. Also in act 820, the first bit vector, having been copied, is cleared.

In act 825, the data writing to the second bit vector is completed, and the bit vectors are flipped once again. Following this, data is written to the first bit vector in act 830. In act 860, histogram totals are updated by subtracting entries in the bit vector array for the next array line to be overwritten. Once the histogram totals are updated, the next array line can be cleared, also in act 860. In act 870, the second bit vector, now complete, is transferred to the next line in the bit vector array and the histogram totals are updated accordingly. Also in act 830, the second bit vector, now copied, can be cleared.

In the above embodiments, two bit vectors are used to provide data for a histogram. In various embodiments of the present invention that do not require a histogram, two bit vectors may be written to in the same alternating manner. The bit vector that is not being written to may either be read from or otherwise used, or copied to another location to be read or otherwise used.

in various embodiments of the present invention, data is written to one vector for a certain duration. The length of this duration or period may be determined by one or more factors. For example, the length may be determined by a certain number of clock cycles. Alternately, the length may be determined by a specific number of instructions or activities. In other embodiments, certain events may trigger the end of the duration. For example, a page flip or other event may trigger the end of data being written to a vector and initiate a vector flip.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of storing page characteristics comprising:
   storing a first plurality of pages in a first memory;
   storing a second plurality of pages in a second memory;
   storing a first plurality of numeric values in a first plurality of locations during a first time, each of the first plurality of numeric values corresponding to a characteristic for one page in the first plurality of pages;
   storing a second plurality of numeric values in a second plurality of locations during a second time, the first time different than the second time, each of the second plurality of numeric values corresponding to the characteristic for one page in the first plurality of pages; and
   adding each first numeric value in the first plurality of numeric values to a corresponding second numeric value in the second plurality of numeric values to generate a histogram,
   wherein the first plurality of numeric values and the second plurality of numeric values are stored using a plurality of physical addresses.

2. The method of claim 1 wherein a number of pages in the first plurality of pages is equal to a number of first numeric values in the first plurality of numeric values.

3. The method of claim 1 wherein the first memory comprises one or more DRAMs and the second memory comprises a hard disk drive.

4. The method of claim 1 wherein the first plurality of numeric values and the second plurality of numeric values are stored in the first memory.

5. The method of claim 1 wherein the plurality of physical addresses are contiguous physical addresses.

6. A method of storing page characteristics comprising:
storing a first plurality of pages in a first memory;
storing a second plurality of pages in a second memory; and
storing a plurality of characteristics for the first plurality of pages,
wherein the plurality of characteristics are stored using a plurality of physical addresses, and
wherein the plurality of physical addresses are noncontiguous physical addresses.

7. The method of claim 1 wherein the plurality of characteristics comprises page usage bits.

8. An integrated circuit comprising:
a frame buffer interface configured to store a plurality of pages of data in a memory, and further configured to store a plurality of characteristics, each characteristic corresponding to a page in the plurality of pages, where the plurality of characteristics are stored during a first time period using a first plurality of physical addresses and during a second time period using a second plurality of physical addresses, the first time period different than the second time period;
a memory management circuit configured to copy the characteristics stored using the first plurality of physical addresses to a first plurality of locations during the second period and further configured to copy the characteristics stored using the second plurality of physical addresses to a second plurality of locations during the first period.

9. The integrated circuit of claim 8 wherein the memory management circuit is further configured to delete characteristics from the first plurality of physical addresses during the second period and to delete characteristics from the second plurality of physical addresses during the first period.

10. The integrated circuit of claim 9 wherein values of the characteristics stored in the first and second pluralities of locations in the memory are used to generate histogram values.

11. The integrated circuit of claim 10 wherein the characteristics stored in the first and second pluralities of locations in the memory comprise page usage bits.

12. The integrated circuit of claim 11 wherein the first and second pluralities of locations are in the memory.

13. The integrated circuit of claim 12 wherein the integrated circuit is a graphics processing unit.

14. A method of managing data in a memory comprising:
storing a first set of characteristic values for a first number of pages in the memory in a bit vector during a first time period, where the first set of characteristic values are stored using physical addresses;
storing a second set of characteristic values for the first number of pages in the memory in a second bit vector during a second time period, the second time period different than the first time period, where the second set of characteristic values are stored using physical addresses;
copying the first set of characteristic values to a first plurality of locations in the memory during the second time period;
deleting the first set of characteristic values during the second time period; and
using the first set of characteristic values to generate a plurality of histogram values.

15. The method of claim 14 further comprising:
storing a third set of characteristic values for the first number of pages in a memory in the first bit vector during a third time period, the third time period different than the second time period, where the third set of characteristic values are stored using physical addresses;
copying the second set of characteristic values to a second plurality of locations in the memory during the third time period;
deleting the second set of characteristic values during the third time period; and
using the first and the second sets of characteristic values to generate the plurality of histogram values.

16. The method of claim 15 wherein the first set of characteristic values comprises a first number of values.

17. The method of claim 15 wherein the memory comprise a DRAM.

18. The method of claim 17 wherein the characteristic values are page access bits.

19. The method of claim 18 wherein the data is used to generate a graphics image.

* * * * *